United States Patent [19]

Iwamoto et al.

[11] Patent Number: 5,194,542

[45] Date of Patent: Mar. 16, 1993

[54] CONTACT LENS

[75] Inventors: Hidetoshi Iwamoto, Kamisato; Yuuichi Yokoyama, Kounosu; Makoto Tsuchiya, Honjo, all of Japan

[73] Assignee: Hoya Corporation, Tokyo, Japan

[21] Appl. No.: 689,885

[22] PCT Filed: Oct. 1, 1990

[86] PCT No.: PCT/JP90/01263

§ 371 Date: May 29, 1991

§ 102(e) Date: May 29, 1991

[87] PCT Pub. No.: WO91/05285

PCT Pub. Date: Apr. 18, 1991

[30] Foreign Application Priority Data

Sep. 30, 1989 [JP] Japan ............................. 1-256521

[51] Int. Cl.$^5$ .................. C08F 18/20; C08F 20/24; C08F 30/08
[52] U.S. Cl. ......................... 526/246; 526/279; 526/245
[58] Field of Search .............. 526/245, 279, 246

[56] References Cited

U.S. PATENT DOCUMENTS

| 4,566,981 | 1/1986 | Howells | 526/245 |
| 4,829,137 | 5/1989 | Stoyan | 526/245 |

FOREIGN PATENT DOCUMENTS

| 0195714 | 9/1986 | European Pat. Off. | 526/245 |
| 0343527 | 11/1989 | European Pat. Off. | 526/249 |
| 63-159820 | 7/1988 | Japan | 526/245 |
| 6445411 | 2/1989 | Japan | 526/245 |
| 8203397 | 10/1982 | World Int. Prop. O. | 526/245 |
| 8604341 | 7/1986 | World Int. Prop. O. | 526/245 |
| 8604342 | 7/1986 | World Int. Prop. O. | 526/245 |
| 8604343 | 7/1986 | World Int. Prop. O. | 526/245 |
| 8805060 | 7/1988 | World Int. Prop. O. | 526/245 |

Primary Examiner—Joseph L. Schofer
Assistant Examiner—N. Sarofim
Attorney, Agent, or Firm—Nixon & Vanderhye

[57] ABSTRACT

This invention relates to a contact lens formed of a copolymer obtained by copolymerizing a monomer mixture containing, as essential components, perfluorooctylethyloxyalkylene (meth)acrylate, siloxanyl (meth)acrylate, alkyl (meth)acrylate, a hydrophilic monomer and a crosslinking agent, and said contact is excellent in all of oxygen permeability, hardness and water wettability and is useful in practical use.

17 Claims, No Drawings ns
CONTACT LENS

TECHNICAL FIELD

This invention relates to a contact lens, and more specifically, it relates to a rigid contact lens, i.e. a so-called "hard contact lens" having oxygen permeability.

TECHNICAL BACKGROUND

At the present time, contact lenses generally used are largely classified into hard contact lenses and soft contact lenses.

As a hard contact lens, an oxygen-permeable hard contact lens is recently proposed which is formed of a copolymer containing, as main components, a silicone-containing (meth)acrylate ["(meth)acrylate" in the present specification stands for both of acrylate and methacrylate] and a fluorine-containing (meth)acrylate. A contact lens of this type is disclosed in Japanese Patent Unexamined Publication No. 63-159820. The contact lens disclosed in this Unexamined Publication is formed of a copolymer containing, as main components, at least one fluoromethacrylate of the following general formula, $$CH_2=C\underset{\underset{O}{\overset{\|}{C}}}{\overset{CH_3}{|}}-O-R_f$$

wherein $R_f$ is $-CH(CF_3)_2$, $-CH_2CH(CF_3)_2$ or $-(CH_2)_2C_nF_{2n+1}$ (n=2-10), and siloxanyl methacrylate. With this contact lens, a sufficient effect on oxygen permeability is obtained.

However, the contact lens disclosed in the above Japanese Patent Unexamined Publication 63-159820 has not been fully satisfactory with regard to hardness. And, the contact lens disclosed in the above Unexamined Publication cannot be said to have sufficient water wettability, although a hydrophilic monomer is used to improve the water wettability. Further, this contact lens has a possibility that when the amount of the hydrophilic monomer is increased to improve the water wettability, the compatibility among this monomer and other monomer(s) decreases, and the resultant polymer therefore undergoes phase separation to become opaque.

As a method of improving the water wettability, it is also proposed to impart a lens surface with hydrophilic nature. Since, however, a hydrophilic nature-imparting layer is very thin, the layer is liable to peel or disappear, and it is often required to treat the lens surface again.

This invention has been made to provide a novel oxygen-permeable contact lens which overcomes the above problems, and it is an object of this invention to provide an oxygen-permeable hard contact lens which has not only suitable oxygen permeability required to actually fit it on but also hardness to fully endure fracture or damage in the ordinary handling and further, which is excellent in water wettability and a sense of fitting it on.

DISCLOSURE OF THE INVENTION

This invention has been made in order to achieve the above object, and the contact lens of this invention is formed of a copolymer obtained by copolymerizing a monomer mixture containing, as essential components, a fluorine-containing monomer of the general formula (I), $$CH_2=C\underset{\underset{O}{\overset{\|}{C}}}{\overset{X}{\diagup}}\diagdown O-Y_n-(CH_2)_2-(CF_2)_7CF_3 \quad (I)$$

wherein X is H or $CH_3$, Y is $-CH_2-CH_2O-$, $-CH_2CH_2CH_2O-$, $$-\underset{\underset{CH_3}{|}}{CHCH_2O}- \text{ or } -\underset{\underset{CH_3}{|}}{CH_2CHO}-,$$

and n is 1, 2 or 3,
siloxanyl (meth)acrylate, alkyl (meth)acrylate, a hydrophilic monomer and a crosslinking agent.

PREFERRED EMBODIMENTS OF THE INVENTION

The fluorine-containing monomer used in this invention is represented by the following general formula (I).

$$CH_2=C\underset{\underset{O}{\overset{\|}{C}}}{\overset{X}{\diagup}}\diagdown O-Y_n-(CH_2)_2-(CF_2)_7CF_3 \quad (I)$$

wherein X is H or $CH_3$, Y is $-CH_2-CH_2O-$, $-CH_2CH_2CH_2O-$, $$-\underset{\underset{CH_3}{|}}{CHCH_2O}- \text{ or } -\underset{\underset{CH_3}{|}}{CH_2CHO}-,$$

and n is 1, 2 or 3.

Examples of the fluorine-containing monomer of the general formula (I) are as follows.

(1) Perfluorooctylethyloxypropylene (meth)acrylate $$CH_2=C\underset{\underset{O}{\overset{\|}{C}}}{\overset{H(CH_3)}{\diagup}}\diagdown O-CH_2-CH_2-CH_2-O-(CH_2)_2-(CF_2)_7CF_3$$

(2) Perfluorooctylethyldi(oxypropylene) (meth)acrylate $$CH_2=C\underset{\underset{O}{\overset{\|}{C}}}{\overset{H(CH_3)}{\diagup}}-O-(CH_2-CH_2-CH_2-O)_2-(CH_2)_2-(CF_2)_7CF_3$$

(3) Perfluorooctylethyltri(oxypropylene) (meth)acrylate $$CH_2=C\underset{\underset{O}{\overset{\|}{C}}}{\overset{H(CH_3)}{\diagup}}-O-(CH_2CH_2CH_2O)_3-(CH_2)_2(CF_2)_7CF_3$$

(4) Perfluorooctylethyloxyisopropylene (meth)acrylate

-continued

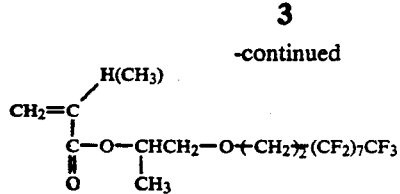

(5) Perfluorooctylethldi(oxyisopropylene) (meth)acrylate

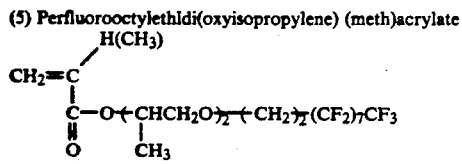

(6) Perfluorooctylethltri(oxyisopropylene) (meth)acrylate

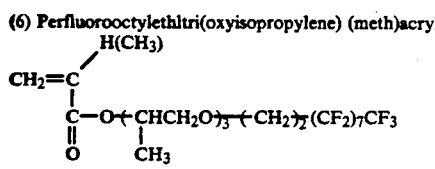

(7) Perfluorooctylethyloxyethylene (meth)acrylate

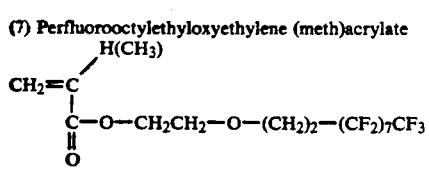

(8) Perfluorooctylethyldi(oxyethylene) (meth)acrylate (9) Perfluorooctylethyltri(oxyethylene) (meth)acrylate

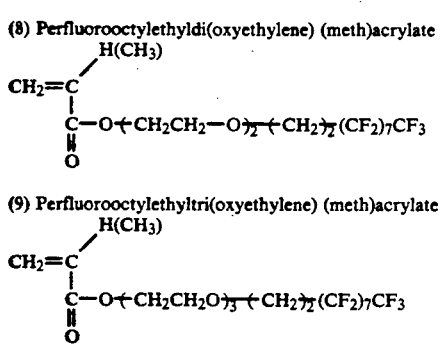

The fluorine-containing monomers of the above group improve oxygen permeability of a contact lens due to a perfluorooctyl group contained, facilitate dispersibility of siloxanyl (meth)acrylate (to be referred to as "Si(M)A" hereinafter) due to its excellent compatibility therewitt, and further, contribute to development of higher oxygen permeability. The oxygen atom adjacent to the ethylene group bonded to the perfluorooctyl group plays a part in imparting hydrophilic nature and providing a good fitting sense. Further, since the ethylene group bonded to the perfluorooctyl group exhibits resistance to hydrolysis caused by water and other nucleophilic reagent, the fluorine-containing monomers are excellent in chemical stability, and the resultant contact lens can be improved in polymerization stability.

Therefore, these fluorine-containing monomers of the above group can contribute to achievement of improved oxygen permeability of the resultant contact lens by increasing an effect of Si(M)A on improvement in oxygen permeability, and at the same, these fluorine-containing monomers play a part in improvement in an effect of a hydrophilic monomer, which is an essential component of the contact lens of this invention and is to be described later, on water wettability, of a lens and provision of a good fitting sense. Further, these fluorine-containing monomers have a function of allowing the alkyl methacrylate (to be referred to as "RMA" hereinafter and to be described later) to exhibit an effect on improvement in the hardness of a produced contact lens, while retaining oxygen permeability. Due to the above various functions, the fluorine-containing monomers of the above group constitute an important and essential component for a copolymer of which the contact lens of this invention is formed. The amount thereof for use is preferably 5 to 65% ("%" stands for "% by weight", and is used in the same sense hereinafter). When this amount is less than 5%, there arise a decrease in surface hardness of a contact lens, and degradation in processability of a contact lens, such as degradation in machinability and polishing properties, etc., and may cause a problem in practical use. When this amount exceeds 65%, the Si(M)A content is deficient, and as a result, there are cases where no desired oxygen permeability can be obtained. This amount is particularly preferably 8 to 59%.

The Si(M)A used in this invention is selected from trimethylsiloxydimethylsilylpropyl (meth)acrylate, bis(-trimethylsiloxy)methylsilylpropyl (meth)acrylate, tris(-trimethylsiloxy)silylpropyl (meth)acrylate, bis[bis(-trimethylsiloxy)methylsiloxanyl]trimethylsiloxysilyl-propyl (meth)acrylate, bis(trimethylsiloxy)methylsiloxanylmonopentamethyldisiloxanylmonotrimethylsiloxanylsilylpropyl (meth)acrylate, bis(pentamethyldisiloxanyl)bis(trimethylsiloxy)methylsiloxanylsilylpropyl (meth)acrylate, etc. In this invention, these Si(M)A's are used alone or in combination.

The above Si(M)A is used to obtain a contact lens having high oxygen permeability. The amount thereof for use is preferably in the range of from 10 to 60%. When this amount is less than 10%, no desired oxygen permeability can be obtained. When it exceeds 60%, the copolymer becomes soft, and the resultant hard contact lens sometimes cannot be used as such. This amount is particularly preferably 16 to 52%.

RMA used in this invention contributes to achievement of improved hardness of the resultant contact lens. The RMA is selected, for example, from methyl methacrylate, ethyl methacrylate, propyl methacrylate (linear and branched propyl methacrylates included), butyl methacrylate (linear and branched butyl methacrylate included), cyclohexyl methacrylate, 4-tert-butylcyclohexyl methacrylate, etc. These RMA's are used alone or in combination. The amount thereof for use is preferably 5 to 45%. When this amount is less than 5%, the hardness of the resultant lens is insufficient. When it exceeds 45%, an extraordinary decrease in oxygen permeability sometimes occurs. This amount is particularly preferably 8 to 36%.

The hydrophilic monomer used in this invention is essential to achieve an improvement in water wettability of the resultant contact lens and in a contact lens fitting sense. This hydrophilic monomer is selected, for example, from acrylamide, methacrylamide, N,N-dimethylacrylamide, N,N-dimethylmethacrylamide, acrylic acid, methacrylic acid, etc. These hydrophilic monomers are used alone or in combination. The amount thereof for use is preferably 5 to 15%. When this amount is less than 5%, no sufficient water wettability can be obtained. When it exceeds 15%, an extraordinary decrease in oxygen permeability is caused, and the resultant copolymer undersirably becomes soft and, further, opacifies. This amount is particularly preferably 8 to 12%.

Of the above hydrophilic monomers, the use of N,N-dimethylacrylamide and methacrylic acid as a mixture is preferred, since this mixture not only improves the water wettability but also improves the hardness and processability.

In this invention, the crosslinking agent is selected from di(meth)acrylates or tri(meth)acrylates or dihydric or polyhydric alcohols such as ethylene glycol di(meth)acrylate, diethylene glycol di(meth)acrylate, triethylene glycol di(meth)acrylate, tetraethylene glycol di(meth)acrylate, polyethylene glycol di(meth)acrylate, trimethylolpropane tri(meth)acrylate, etc. Allyl (meth)acrylate may be also used. These crosslinking agents may be alone or in combination. The amount thereof for use is properly 0.1 to 15%. When this amount is less than 0.1%, the crosslinking effect is insufficient, and therefore, the resultant contact lens is soft and is easily damaged and deformed. When it exceeds 15%, the copolymer is fragile and poor in processability, or the resultant contact lens is liable to fracture. This amount is particularly preferably 1.5 to 9%.

In this invention, as the crosslinking agent, a siloxane oligomer of the following formula (II) and/or a siloxane oligomer of the following formula (III) may be used.

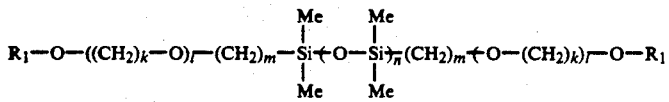

(II)

wherein k is an integer of 1 to 3, l is 0 or 1, m is an integer of 0 to 3, n is an integer of 9 to 199, Me is CH$_3$, and R$_1$ is

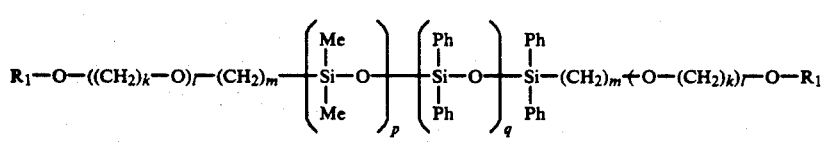

in which R$_2$ is H or Me.

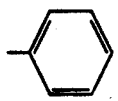

resistance can be imparted to the lens material and lens. When it exceeds 6,000, the lens material and lens are made to become soft. More preferred are those oligomers having a molecular weight in the range of from 1,000 to 5,000.

The amount of the above siloxane oligomer for use varies depending upon the kind of monomers used to improve the oxygen permeability and the amount of such monomers. In general, however, this amount is properly 0.1 to 15%. When it exceeds 15%, the polymer is liable to undergo plastic deformation. When it is less than 0.1%, undersirably, the crosslinking effect and the effect on improvement in shock resistance cannot be obtained. This amount is particularly preferably 2 to 11%.

The siloxane oligomer of the general formula (II) and/or the siloxane oligomer of the general formula (III) may be used in combination with the di(meth)acrylate or tri(meth)acrylate of a dihydric or polyhydric alcohol.

In this invention, for example, the following monomer components for a contact lens may be used in addition to the above essential components: 2,2,2-trifluoroethyl methacrylate, 2,2,2-trifluoroethyl acrylate, 2,2,3,3-tertrafluoropropyl methacrylate, 2,2,3,3-tetrafluoropropyl acrylate, 2,2,3,3,3-pentafluoropropyl methacrylate, 2,2,3,3,3-pentalfluropropyl acrylate, 2,2,2-trifluoro-1-trifluoromethylethyl methacrylate, 2,2,2-trifluoro-1-trifluoromethylethyl acrylate, 2,2,3,3-tetrafluoro-tert-amyl methacrylate, 2,2,3,3-tetrafluoro-tert-amyl acrylate, 2,2,3,4,4,4-hexafluorobutyl methacrylate, 2,2,3,4,4,4-hexafluorobutyl acrylate, 2,2,3,4,4,4-hexafluoro-tert-hexyl methacrylate, 2,2,3,4,4,4-hexafluoro-tert-hexyl acrylate, 2,2,3,3,4,4,5,5-octafluropentyl methacrylate, 2,2,3,3,4,4,5,5-octafluoropentyl acrylate, tert-amyl methacrylate, tert-amyl acrylate, cyclohexyl acrylate, tetrahydrofurfuryl methacrylate, tetrahydrofurfuryl acrylate, benzyl methacrylate, adamantyl methacrylate, methylcarbitol methacrylate, methyltriglycol methacrylate, butoxyethyl methacrylate, 2-hydroxyethyl methacrylate, 2-hydroxyethyl acrylate, 2-hydroxypropyl methacrylate, 2-hydroxypropyl acrylate, glycidyl acrylate, glycidyl methacrylate, diacetoneacrylamide, diacetonemethacrylamide, N,N-dimethylaminomethyl methacrylate, N,N-diamethylaminomethyl methacrylate, N,N-dimethylaminoethyl methacrylate, N-methylpyrrolidone, etc.

When the contact lens of the invention is produced, a polymerization initiator is added to a mixture of the above monomers, and the resultant mixture is stirred to form a homogeneous polymerization liquid.

(III)

wherein k is an integer of 1 to 3, l is 0 or 1, m is an integer of 0 to 3, p+q is an integer of 11 to 139 (provided that p≧0 and q≧0), Me is CH$_3$, Ph is and R$_1$ is as defined in the formula (II).

These siloxane oligomers are suitably used, since these oligomers, like the above other crosslinking agents, have not only a crosslinking effect but also a function to achieve improved shock resistance of the resultant contact lens material and contact lens. Preferred are those siloxane oligomers having a molecular weight in the range of from 800 to 6,000. When this molecular weight is less than 800, no sufficient shock The polymerization initiator used above is selected from generally known radical-generating agents, e.g.

peroxides such as lauroyl peroxide, cumene hydroperoxide, bis-4-tert-butylcyclohexyl peroxide, etc., and azo compounds such as azobisisobutyronitrile, azobisdimethylvaleronitrile, etc. Of these, particularly preferred is azobisdimethylvaleronitrile. The amount of the above polymerization initiator for use is preferably 0.2 to 1% based on the total weight of the monomers.

Thereafter, the above polymerization liquid is cast into a mold made of a metal, glass, plastic, or the like, and the mold is closed. The temperature inside the mold is stepwise or continuously elevated by means of a constant-temperature bath in the temperature range between 25° C. and 150° C., and the polymerization is completed for about 5 to 72 hours. The so-obtained polymer is finished into a lens form by a conventional contact lens processing means, i.e. mechanical processing means such as cutting, polishing, etc. Alternatively, in the production of the contact lens of this invention, a lens form can be directly formed by casting the above polymerization liquid into a mold having a prescribed radius of curvature. The polymerization may be carried out by a photopolymerization method utilizing energy of ultraviolet light, visible light, etc.

This invention will be explained further in detail below by reference to Examples. However, this invention shall not be limited to these Examples only. In addition, physical property values described in Examples and Comparative Examples were obtained by the following methods.

Oxygen permeability coefficient: A test piece having a thickness of 0.2 mm was measured in a 0.9% physiological saline at 35° C. with a film oxygen transmissiometer of Seika type supplied by Rikaseiki Kogyo K.K.

Shore hardness: A test piece having a diameter of 15 mm and thickness of 3 mm was measured with a Shore method durometer hardness tester supplied by Zwick.

Hydrophilic contact angle: A disk-shaped test piece having a diameter of 15 mm and a thickness of 1 mm was immersed in water for 72 hours. Thereafter, water was wiped away from the test piece surface, and the test piece was measured by an in-air liquid dropping method with a Erma contact angle measuring machine supplied by Erma Kogaku. The contact angle data shown in Table 1 are those obtained 1 minute after liquid was dropped.

EXAMPLE 1

58.8 Percent of perfluorooctylethyloxypropylene methacrylate (FOMA), 8.5% of methyl methacrylate (to be referred to as MMA hereinafter), 16.8% of tri(-trimethylsiloxy)silylpropyl methacrylate (to be referred to as $S_1$ hereinafter), 12.5% of methacrylic acid (to be referred to as MA hereinafter), 1.7% of N,N-dimethylacrylamide (to be referred to as DX hereinafter) and 1.7% of trimethylopropane trimethacrylate (to be referred to as TMPT hereinafter) were mixed, and added to the resultant monomer mixture was 0.5%, based on the total monomer weight, of azobisdimethylvaleronitrile (V-65) as a polymerization initiator to form a homogeneous solution. Then, the homogeneous solution was poured into a tube made of polypropylene, and the tube was internally brought into a nitrogen atmosphere and closed. The monomers were copolymerized in a 45° C. constant-temperature bath for 24 hours, further in a hot air dryer at 60° C. for 24 hours, at 80° C. for 12 hours, and at 100° C. for 12 hours. The resultant copolymer was colorless, transparent and optically uniform. The copolymer was measured for its physical properties to show an oxygen permeability coefficient of $44 \times 10^{-11}[mlO_2(STP)cm/cm^2 \cdot sec \cdot mmHg]$, a Shore hardness of 81 and a water contact angle (hydrophilic contact angle), showing water wettability, of 68 degrees as shown in Table 1. These values are excellent.

The above copolymer was cut and polished in a conventional manner to prepare a hard contact lens. This polymer showed good machinability in cutting and polishing.

The so-obtained contact lens in this Example was colorless, transparent and optically uniform, and it had all of excellent oxygen permeability, hardness and water wetability.

EXAMPLE 2-29

The procedure of Example 1 was repeated by using monomers shown in Table 1 in the proportions shown in Table 1, whereby copolymers and contact lenses in these Examples were obtained. The copolymers were measured for their physical properties in the same manner as in Example 1. Table 1 shows their data.

The copolymers in these Examples showed excellent values with regard to the oxygen permeability coefficient, Shore hardness and hydrophilic contact angle. These copolymers also showed excellent machinability in cutting and polishing.

COMPARATIVE EXAMPLE 1

FOMA only was polymerized under the same conditions as those in Example 1 to give an FOMA homopolymer. The FOMA homopolymer was measured for physical properties, and Table 1 shows their data.

COMPARATIVE EXAMPLES 2-5

The procedure of Example 1 was repeated by using monomers shown in Table 1 in the proportions shown in Table 1, whereby copolymers and contact lenses in these Comparative Examples were obtained. The copolymers were measured for their physical properties in the same manner as in Example 1. Table 1 shows their data.

In addition, abbreviations used in Examples and Comparative Examples stand of the following.
FOMA: perfluorooctylethyloxypropylene methacrylate
FOIMA: perfluorooctylethyloxyisopropylene methacrylate
FOEMA: perfluorooctylethyloxyethylene methacrylate
Si(M)A: Siloxanyl (meth)acrylate
$S_1$: tris(trimethylsiloxy)silylpropyl methacrylate
$S_2$: bis(trimethylsiloxy)methylsilylpropyl methacrylate
$S_3$: trimethylsiloxydimethylsilylpropyl methacrylate
$S_4$: pentamethyldisiloxanylmethyl methacrylate
RMA: alkyl methacrylate
MMA: methyl methacrylate
IPMA: isopropyl methacrylate
CHMA: cyclohexyl methacrylate
MA: methacrylic acid
DX: N,N-dimethylacrylamide
TMPT: trimethylolpropane trimethacrylate
HDMP: 2-hydroxy-1,3-dimethacryloxypropane
1G: ethylene glycol dimethacrylate
3G: triethylene glycol dimethacrylate
SIOL-1: oligomer of the formula (II) in which $R_2=H$, $k=3$, $l=1$, $m=3$ and $n=12$.
SIOL-2: oligomer of the formula (II) in which $R_2=CH_3$, $k=3$, $l=1$, $m=3$ and $n=13$.

SIOL-3: oligomer of the formula (II) in which $R_2=H$, $k=3$, $l=1$, $m=3$ and $n=21$.

6F: hexafluoroisopropyl methacrylate

TABLE 1

| MONOMER COMPOSITION (wt. %) | | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| Fluorine-containing monomer | FOMA | 58.8 | 61 | 58 | 35 | 33.3 | 33.3 | 16.1 | 17.1 | 17.1 | 8.8 | 9 | 40 | 17 | 30 |
| | FOIMA | | | | | | | | | | | | | | |
| | FOEMA | | | | | | | | | | | | | | |
| Si(M)A | $S_1$ | 16.8 | 17.8 | 17 | 26.3 | 25 | 25 | 48.4 | 51.3 | 51.3 | 44 | 44.5 | | | 15 |
| | $S_2$ | | | | | | | | | | | | 25 | | |
| | $S_3$ | | | | | | | | | | | | | 50 | |
| | $S_4$ | | | | | | | | | | | | | | 10 |
| RMA | MMA | 8.5 | | | 26.3 | | | 24.2 | | | | | 20 | | 30 |
| | IPMA | | 8.8 | | | 25 | | | 17.1 | | 35 | 35.7 | | 17 | |
| | CHMA | | | 8.3 | | | 25 | | | 17.1 | | | | | |
| Hydrophilic monomer | MA | 12.5 | 8.8 | 4.2 | 8.8 | 8.3 | 4.2 | 8.1 | 8.5 | 8.5 | 8.8 | 9 | 12 | 9 | 10 |
| | DX | 1.7 | 1.8 | 8.3 | 1.8 | 4.2 | 4.2 | 1.6 | 1.7 | 1.7 | 1.7 | | | 4 | 3 |
| Crosslinking agent | TMPT | 1.7 | 1.8 | 4.2 | 1.8 | | | 1.6 | | | | 1.7 | 3 | | |
| | HDMP | | | | | 4.2 | | | | 4.3 | | | | 3 | |
| | 1G | | | | | | 8.3 | | | | 4.3 | | 1.8 | | 2 |
| | 3G | | | | | | | | | | | | | | |
| | SIOL-1 | | | | | | | | | | | | | | |
| | SIOL-2 | | | | | | | | | | | | | | |
| | SIOL-3 | | | | | | | | | | | | | | |
| (*1) | 6F | | | | | | | | | | | | | | |
| PHYSICAL PROPERTIES | | | | | | | | | | | | | | | |
| Oxygen permeability coefficient (*2) | | 44 | 46 | 40 | 39 | 38 | 40 | 51 | 55 | 47 | 63 | 43 | 42 | 53 | 38 |
| Shore hardness | | 81 | 77 | 77 | 86 | 82 | 84 | 82 | 77 | 76 | 83 | 81 | 79 | 78 | 85 |
| Hydrophilic contact angle (degree) | | 68 | 77 | 79 | 79 | 80 | 80 | 75 | 80 | 78 | 80 | 69 | 79 | 80 | 77 |

| MONOMER COMPOSITION (wt. %) | | 15 | 16 | 17 | 18 | 19 | 20 | 21 | 22 | 23 | 24 | 25 | 26 | 27 | 28 |
|---|---|---|---|---|---|---|---|---|---|---|---|---|---|---|---|
| Fluorine-containing monomer | FOMA | 40 | 35 | 23 | 33 | 50 | 10 | 30 | 19 | | | 31 | 25 | | |
| | FOIMA | | | | | | | | | 30 | 20 | | | | 30 |
| | FOEMA | | | | | | | | | | | | | 20 | |
| Si(M)A | $S_1$ | | 25 | 37 | 31 | 15 | 45 | 30 | 40 | 31 | 35 | 30 | 32 | 40 | 32 |
| | $S_2$ | 25 | | | | | | | | | | | | | |
| | $S_3$ | | | | | | | | | | | | | | |
| | $S_4$ | | | | | | | | | | | | | | |
| RMA | MMA | 20 | 15 | 25 | 15 | 8 | 28 | 16 | 20 | 16 | 20 | | | 18 | 22 |
| | IPMA | | 10 | | | | | | | | | 15 | | | |
| | CHMA | | | | | | | | | | | | 17 | | |
| Hydrophilic monomer | MA | 8 | 8 | 9 | 8 | 8 | 9 | 8 | 4 | 8 | 9 | 9 | 11 | 10 | 8 |
| | DX | 4 | 5 | 5 | 5 | 4 | 4.5 | 4 | 2 | 4 | 5 | 3 | 3 | 3 | 2.5 |
| Crosslinking agent | TMPT | 3 | | | | | | 4 | | 3 | | | | | |
| | HDMP | | 2 | | | | | | 6 | | | | | | |
| | 1G | | | | | | 1.5 | | | | | 3 | 3 | 4 | 2 |
| | 3G | | | | | | | | | | | | | | 2.5 |
| | SIOL-1 | | | | 8 | | 2 | 8 | 9 | 8 | 8 | | 8 | 7 | 3 |
| | SIOL-2 | | | 1 | | | | | | | | 9 | | | |
| | SIOL-3 | | | | | 15 | | | | | | | | | |
| (*1) | 6F | | | | | | | | | | | | | | |
| PHYSICAL PROPERTIES | | | | | | | | | | | | | | | |
| Oxygen permeability coefficient (*2) | | 39 | 41 | 37 | 40 | 49 | 35 | 40 | 36 | 41 | 38 | 49 | 47 | 39 | 40 |
| Shore hardness | | 85 | 85 | 83 | 81 | 78 | 77 | 81 | 78 | 80 | 82 | 82 | 81.5 | 82 | 81.5 |
| Hydrophilic contact angle (degree) | | 78 | 77 | 71 | 73 | 74 | 72 | 70 | 74 | 71 | 70 | 73 | 72 | 73 | 68 |

| MONOMER COMPOSITION (wt. %) | | Example 29 | Comparative Example 1 | 2 | 3 | 4 | 5 |
|---|---|---|---|---|---|---|---|
| Fluorine-containing monomer | FOMA | | 100 | | 15 | 80 | 60 |
| | FOIMA | 29 | | | | | |
| | FOEMA | | | | | | |
| Si(M)A | $S_1$ | 32 | | 25 | 20 | | |
| | $S_2$ | | | | | | |
| | $S_3$ | | | | | | |
| | $S_4$ | | | | | | |
| RMA | MMA | 21 | | 30 | | 20 | 40 |
| | IPMA | | | | 55 | | |
| | CHMA | | | | | | |
| Hydrophilic monomer | MA | 8 | | 10 | 3 | | |
| | DX | 2.5 | | | 5 | | |
| Crosslinking agent | TMPT | | | | 5 | | |
| | HDMP | | | | | | |
| | 1G | | | | | | 2 |
| | 3G | 2.5 | | | | | |
| | SIOL-1 | 5 | | | | | |

TABLE 1-continued

|  |  |  |  |  |  |  |  |
|---|---|---|---|---|---|---|---|
|  | SIOL-2 |  |  |  |  |  |  |
|  | SIOL-3 |  |  |  |  |  |  |
| (*1) | 6F |  | 30 |  |  |  |  |
| PHYSICAL PROPERTIES |  |  |  |  |  |  |  |
| Oxygen permeability coefficient (*2) |  | 43 | 47 | 20 | 15 | 40 | 18 |
| Shore hardness |  | 81 | 28 | 82 | 80 | 65 | 75 |
| Hydrophilic contact angle (degree) |  | 69 | 94 | 86 | 87 | 88 | 85 |

*1: conventional fluorine-containing monomer
*2: $\times 10^{-11}$ [mlO$_2$ (STP) cm/cm$^2 \cdot$ sec $\cdot$ mmHg]

As is clearly shown in Table 1, some of the contact lenses obtained in Comparative Examples are excellent in respect of one or two values of the oxygen permeability coefficient, Shore hardness and hydrophilic contact angle, whereas no contact lens is excellent in respect of all of the values of these physical properties. In contrast, all the contact lenses obtained in Examples of this invention are excellent in respect of the values of the above three physical properties, and these contact lenses are excellent in respect of these values without exception and well-balanced for practical use.

Therefore, the contact lenses of Examples of this invention have all of excellent oxygen permeability, excellent hardness and excellent water wettability.

As detailed above, the contact lens obtained according to this invention is excellent in all of oxygen permeability, hardness and water wettability which are required for actually fitting it on, and very useful in practical use.

What is claimed is:

1. A contact lens formed of a copolymer obtained by copolymerizing a monomer mixture containing, as essential components, a fluorine-containing monomer of the general formula (I),

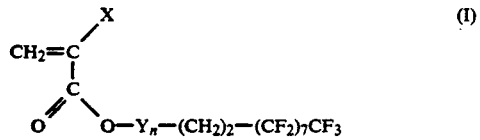

wherein X is H or CH$_3$, Y is —CH$_2$—CH$_2$O—, —CH$_2$CH$_2$CH$_2$O—,

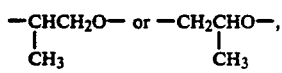

and n is 1, 2 or 3, siloxanyl (meth)acrylate, alkyl (meth)acrylate, a hydrophilic monomer and a crosslinking agent.

2. A contact lens according to claim 1, wherein the monomer mixture contains 5 to 65% by weight of the fluorine-containing monomer, 10 to 60% by weight of the siloxanyl (meth)acrylate, 5 to 45% by weight of the alkyl methacrylate, 5 to 15% by weight of the hydrophilic monomer and 0.1 to 15% by weight of the crosslinking agent.

3. A contact lens according to claim 1, wherein the fluorine-containing monomer is at least one member selected from the group consisting of perfluorooctylethyloxypropylene (meth)acrylate, perfluorooctylethyldi(oxypropylene) (meth)acrylate, perfluorooctylethyltri(oxypropylene) (meth)acrylate, perfluorooctylethyloxyisopropylene (meth)acrylate, perfluorooctylethyldi(oxyisopropylene) (meth)acrylate, perfluorooctylethyltri(oxyisopropylene) (meth)acrylate, perfluorooctylethyloxyethylene (meth)acrylate, perfluorooctylethyldi(oxyethylene) (meth)acrylate, and perfluorooctylethyltri(oxyethylene) (meth)acrylate.

4. A contact lens according to claim 1, wherein the siloxanyl (meth)acrylate is at least one member selected from the group consisting of trimethylsiloxydimethylsilylpropyl (meth)acrylate, bis(trimethylsiloxy)methylsilylpropyl (meth)acrylate, tris(trimethylsiloxy)silylpropyl (meth)acrylate, bis[bis(trimethylsiloxy)methylsiloxanyl]trimethylsiloxysilylpropyl (meth)acrylate, bis(trimethylsiloxy)methylsiloxanylmonopentamethyldisiloxanylmonotrimethylsiloxanylsilylpropyl (meth)acrylate, and bis(pentamethyldisiloxanyl)bis(trimethylsiloxy)methylsiloxanylsilylpropyl (meth)acrylate.

5. A contact lens according to claim 1, wherein the alkyl methacrylate is at least one member selected from the group consisting of methyl methacrylate, ethyl methacrylate, propyl methacrylate, butyl methacrylate, cyclohexyl methacrylate, and 4-tert-butylcyclohexyl methacrylate.

6. A contact lens according to claim 1, wherein the hydrophilic monomer is at least one member selected from the group consisting of acrylamide, methacrylamide, N,N-dimethylacrylamide, N,N-dimethylmethacrylamide, acrylic acid, and methacrylic acid.

7. A contact lens according to claim 1, wherein the crosslinking agent is a di(meth)acrylate or tri(meth)acrylate of a dihydric or polyhydric alcohol.

8. A contact lens according to claim 1, wherein the crosslinking agent is a di(meth)acrylate or tri(meth)acrylate of a dihydric or polyhydric alcohol, the di(meth)acrylate or tri(meth)acrylate being at least one member selected from the group consisting of ethylene glycol di(meth)acrylate, diethylene glycol di(meth)acrylate, triethylene glycol di(meth)acrylate, tetraethylene glycol di(meth)acrylate, polyethylene glycol di(meth)acrylate, and trimethylolpropane tri(meth)acrylate.

9. A contact lens according to claim 1, wherein the crosslinking agent is allyl (meth)acrylate.

10. A contact lens according to claim 1, wherein the crosslinking agent is a siloxane oligomer of the general formula (II) or a siloxane oligomer of the general formula (III),

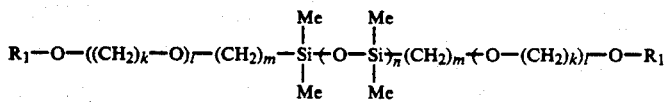
(II)

Wherein k is an integer of 1 to 3, l is 0 or 1, m is an integer of 0 to 3, n is an integer of 9 to 199, Me is CH₃, and R₁ is

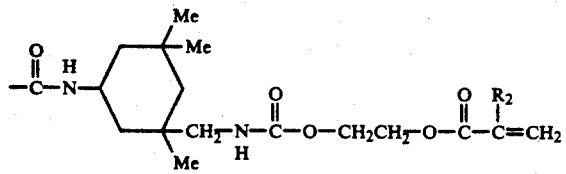

in which R₂ is H or Me,

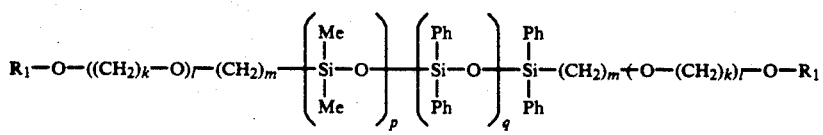
(III)

wherein k is an integer of 1 to 3, l is 0 or 1, m is an integer of 0 to 3, p+q is an integer of 11 to 139, provided that p≧0 and q≧0, Me is CH₃, Ph is

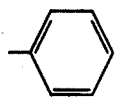

and R₁ is as defined in the formula (II).

11. A contact lens according to claim 7, wherein the crosslinking agent is a mixture of di(meth)acrylate or tri(meth)acrylate of a dihydric or polyhydric alcohol with a siloxane oligomer of the general formula (II) and/or a siloxane oligomer of the general formula (III).

12. A contact lens according to claim 1 wherein the monomer mixture contains a conventionally known monomer for a contact lens.

13. A contact lens according to claim 1, which is hard or rigid.

14. A composition for a contact lens, which comprises a monomer mixture containing, as essential components, a fluorine-containing monomer of the general formula (I),

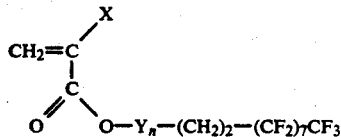
(I)

wherein X is H or CH₃, Y is —CH₂—CH₂O—, —CH₂CH₂CH₂O—,

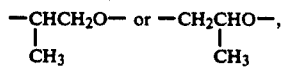

and n is 1, 2 or 3, siloxanyl (meth)acrylate, alkyl (meth)acrylate, a hydrophilic monomer and a crosslinking agent.

15. A composition according to claim 14, wherein the monomer mixture contains 5 to 65% by weight of the fluorine-containing monomer, 10 to 60% by weight of the siloxanyl (meth)acrylate, 5 to 45% by weight of the alkyl methacrylate, 5 to 15% by weight of the hydrophilic monomer and 0.1 to 15% by weight of the crosslinking agent.

16. A composition for a contact lens, which is obtained by copolymerizing a monomer mixture containing, as essential components, a fluorine-containing monomer of the general formula (I),

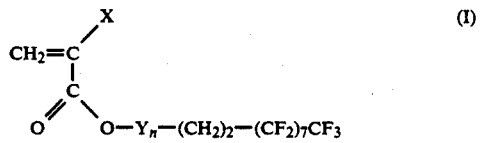
(I)

wherein X is H or CH₃, Y is —CH₂—CH₂O—, —CH₂CH₂CH₂O—,

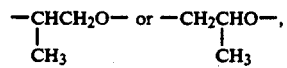

and n is 1, 2 or 3, siloxanyl (meth)acrylate, alkyl (meth)acrylate, a hydrophilic monomer and a crosslinking agent.

17. A composition according to claim 16, wherein the monomer mixture contains 5 to 65% by weight of the fluorine-containing monomer, 10 to 60% by weight of the siloxanyl (meth)acrylate, 5 to 45% by weight of the alkyl methacrylate, 5 to 15% by weight of the hydrophilic monomer and 0.1 to 15% by weight of the crosslinking agent.

* * * * *